A. H. ASPROOTH.
CHANGE SPEED GEARING.
APPLICATION FILED JULY 2, 1919.
1,389,287.
Patented Aug. 30, 1921.
2 SHEETS—SHEET 1.
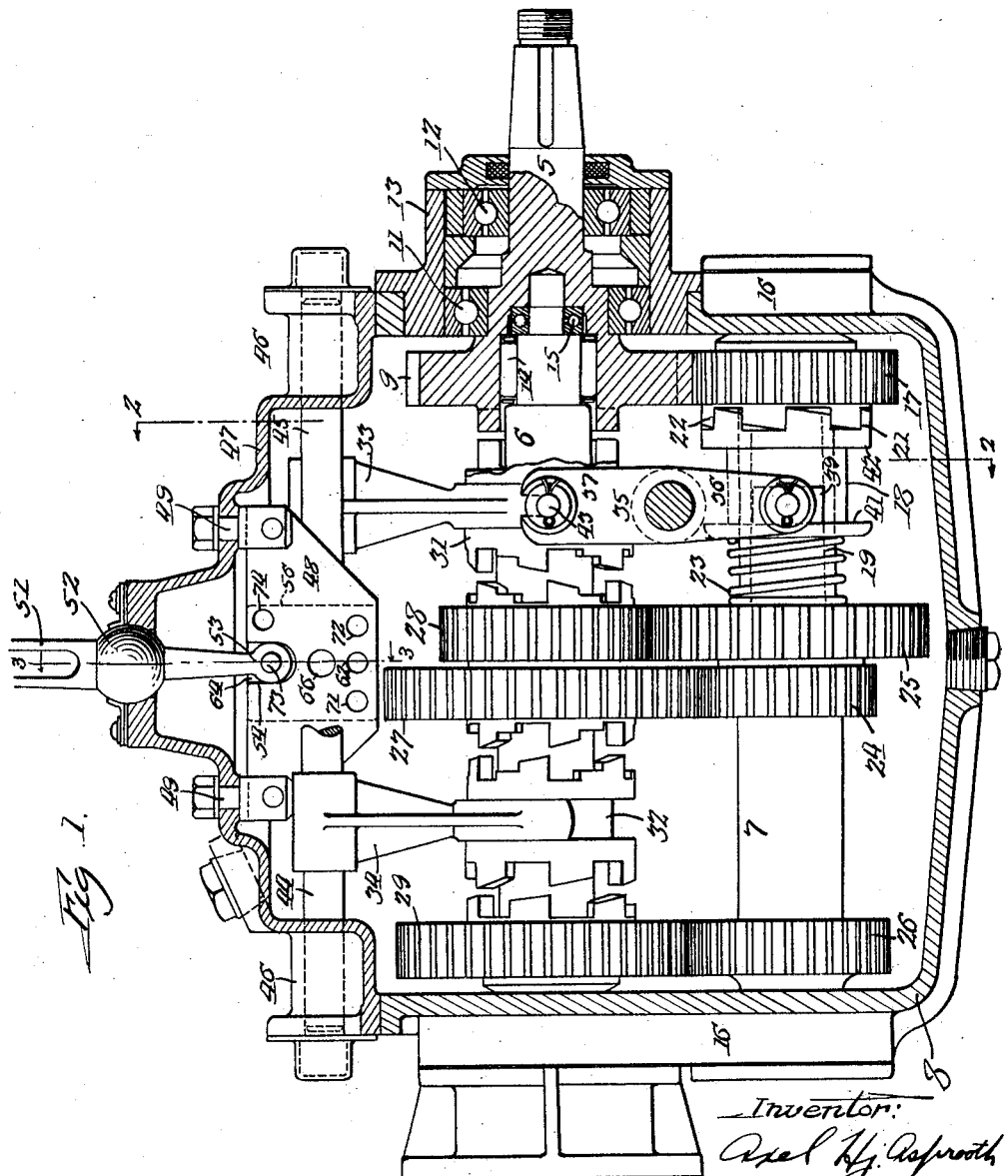

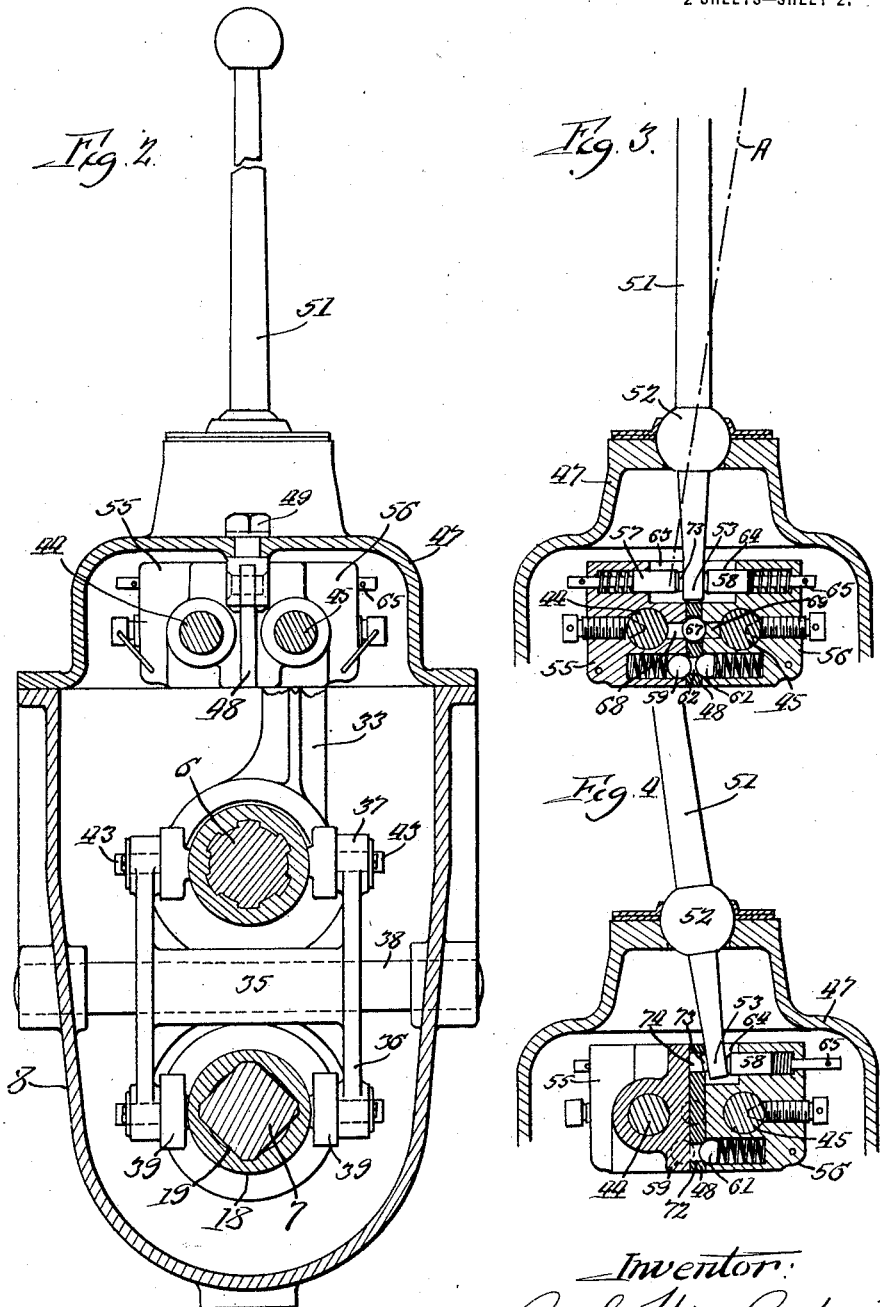

UNITED STATES PATENT OFFICE.

AXEL HJ. ASPROOTH, OF ROCKFORD, ILLINOIS, ASSIGNOR TO COTTA TRANSMISSION COMPANY, OF ROCKFORD, ILLINOIS, A CORPORATION OF ILLINOIS.

CHANGE-SPEED GEARING.

1,389,287.  Specification of Letters Patent.  Patented Aug. 30, 1921.

Application filed July 2, 1919. Serial No. 308,324.

*To all whom it may concern:*

Be it known that I, AXEL HJ. ASPROOTH, a citizen of the United States, residing at Rockford, in the county of Winnebago and State of Illinois, have invented certain new and useful Improvements in Change-Speed Gearing, of which the following is a specification.

This invention pertains in general to change speed gearing, and has more particular reference to that class of gearing constituting a transmission unit, especially adapted for tractors, trucks and similar motor driven vehicles.

One of the important objects of the present invention is to provide a novel shifting mechanism operated by hand for selecting any of a given number of speeds forward and reverse. In this regard, I have aimed to provide a construction exceptionally simple in design, so as to be capable of production at a comparatively low cost, and which is thoroughly practical and serviceable and will positively lock the parts in the respective positions to which they have been moved by the operating or shifting lever. This shifting mechanism embodies various novel features, the particular nature of which will be more fully pointed out hereinafter.

My invention also contemplates as an object the provision of improved and novel means for establishing driving connection between the driving and driven shafts and the countershaft of a change speed gearing of the type in which the gears are always in mesh and the drive is broken and connected at different points through the intermediary of heavy jaw clutches. My improvements in this regard pertain more particularly to that type of transmission in which a separate clutch is employed to connect the driving and driven shafts and another clutch for connecting the driving shaft to the countershaft, which carries fixed gears meshing with gears loose on the driven shaft and adapted to be connected at will to such driven shaft for effecting certain driving speeds. My present invention provides novel means for operating the two clutches just mentioned, so that one will be engaged and the other disengaged by operation of a single member arranged in a novel and particularly desirable manner. The features embraced by this phase of my invention will also be more fully considered hereinafter in the general description.

Other objects and attendant advantages will be appreciated by those familiar with this art as the invention becomes better understood by reference to the following description when considered in connection with the accompanying drawings in which—

Figure 1 is a vertical sectional view through a change speed gear transmission embodying my improvements;

Fig. 2, a transverse sectional view taken substantially on the line 2—2 of Fig. 1.

Fig. 3, a detail sectional view taken substantially on the line 3—3 of Fig. 1, showing the parts in neutral position; and Fig. 4, a somewhat similar sectional view, but showing the shifting lever in the third or direct speed position.

In the exemplification of my present improvement, it should be understood that the particular construction and arrangement of gears, bearings, casings, clutches, etc., is not important as these might be varied considerably. I have illustrated my improvements in connection with a transmission including, generally stated, a driving shaft 5, a driven shaft 6 and a countershaft 7 mounted on suitable bearings in a casing designated generally by character 8. In the present instance, the driving shaft 5 formed integral with a driving gear 9 is revolubly mounted on inner and outer sets of roller bearings 11 and 12 respectively carried by a bearing housing 13 suitably secured to the main casing 8. The driven shaft 6 is mounted at one end on suitable roller and end thrust bearings 14 and 15 respectively co-axial with and in the inner end of the driving shaft 5 and at its opposite end in suitable bearings, not shown, in the opposite end of the casing 8. The countershaft 7 is also journaled at its opposite ends in suitable bearings contained within the bearing housing 16.

The change speeds desired to be effected in this particular instance are first, second and third speeds forward and a reverse. It is also desired that the gears shall always be in mesh and that the changes in speed shall be effected through the agency of suitable clutches. To this end, the driving gear 9 meshes with a gear 17 loose on the countershaft and adapted to be connected thereto through the agency of a clutch. This clutch in the present case, consists of a shiftable element 18 fittingly and slidably engaged on the squared portion 19 of the countershaft and provided with a toothed or jaw face 21 adapted to engage with a complementary jaw face 22 fixed to the gear 17. An expansion spring 23 constantly urges the element 18 lengthwise on the countershaft in a direction to engage the teeth 21 and 22 to thereby establish a driving connection between the drive shaft 5 and the countershaft 7. The clutch element 18 may be moved in the opposite direction, by means which will be presently described, to disengage the clutch.

The countershaft 7 carries a plurality of fixed gears 24, 25 and 26 which mesh respectively with gears 27, 28 and 29 loose on the driven shaft, the connection between the gears 26 and 29 being through the intermediary of a reversing gear, not shown, but the arrangement of which is well known in this art. The gears 27, 28 and 29 are respectively equipped with toothed or jaw faces so that each of the latter constitutes one element of a clutch adapted to be connected to the driven shaft by means of clutch elements splined on such shaft. These shiftable clutch elements 31 and 32 having jaw faces complementary to the respective toothed or jaw faces on the gears are adapted to be shifted lengthwise on the driven shaft by means of forks 33 and 34 operable by mechanism which will be described hereinafter. The clutch element 31, it will be noted, is adapted when moved to the right, viewing Fig. 1, to connect directly to the gear 9 and consequently to the driving shaft for establishing a direct driving connection between this shaft and the driven shaft.

My invention contemplates the provision of novel means operative between the clutch elements 18 and 31 for operating these in unison but in opposite directions to substantially simultaneously engage the direct speed clutch and disengage the clutch between the driving shaft and countershaft, and vice versa, when moved in the opposite direction. This means is so constructed, however, that the clutch element 18 remains engaged during the operation of the clutch elements 31 and 32 for effecting all changes except that of the direct speed. In order to effect this desired coöperative action of the clutch elements 18 and 31, I employ a single member 35 operative between said clutch elements and having opposed yoked ends 36 and 37 coöperatively associated with the clutch elements 18 and 31 respectively. In the present instance the member 35 is pivotally mounted on a stationary shaft 38 suitably carried by the casing 8 as shown in Fig. 2, and interposed between the driving shaft and countershaft. The yoke arms 36 engage with the clutch element 18 in such manner as to move independently thereof when the clutch faces 21 and 22 have been engaged and the member 35 is oscillated in a counterclockwise direction viewing Fig 1, to connect the gear 28 to the driven shaft. That is, a lost motion connection is provided between the yoke 36 and the clutch element 18, permitting the shifting member 35 to be operated at a certain time independently of the clutch element 18. As shown, the yoke arms 36 carry blocks 39 operable between the shoulders 41 and 42 of the clutch element 18. The upper yoke arms 37 are bifurcated and embrace the outstanding pins 43 carried by the shifting fork 33. From the foregoing, it will be manifest that when the fork 33 is shifted to the right viewing Fig. 1, the driving shaft 5 will be connected directly to the driven shaft 6 through the agency of the clutch element 31, and by this movement the member 35 will be oscillated in a clockwise direction, thereby withdrawing the jaw teeth 21 from the teeth 22 against the pressure of the spring 23 and disconnecting the countershaft from the driving shaft. In other words, this single operation of the shifting fork 33 effects a direct driving connection and disconnects the countershaft from the driving shaft.

When the shifting fork 33 is returned to the neutral position shown in Fig. 1, the clutch between the countershaft and the driving shaft will be engaged by the action of the spring 23, so that if the driving shaft is revolved all of the gears will be likewise revolved. The first speed forward is effected by shifting the fork 34 to the right viewing Fig. 1, to connect the gear 27 to the driven shaft, and upon shifting this fork to its extreme opposite position the gear 29 will be connected to the driven shaft and establish the reverse drive. The mechanism for shifting the forks 33 and 34 is so designed as to prevent shifting movement of one when the other has been operated, and for this reason either the fork 33 or 34 must be returned to neutral position before the other can be operated. The second speed is effected by shifting the fork 33 to the left viewing Fig. 1, to connect the gear 28 to the driven shaft, and the third speed connection has been described. It will be noted in engaging the second speed clutch that the clutch between the driving shaft and countershaft remain engaged and the blocks 39 simply move idly to the right in the space provided between the shoulders 41 and 42.

Reference will now be had to the mechanism for shifting the yokes 33 and 34 to effect the different changes in speed. The yokes are fixed respectively to the shifting rods 44 and 45 which are slidable longitudinally in bearings 46 formed integral with the casing cover designated generally by character 47. A locking or dividing plate 48 interposed between the rods 44 and 45 is supported in a stationary position by means of bolts 49 rigidly united to the plate and clamped to the casing covering 47. A shifting lever 51 having the usual ball mounting 52 on the casing cover is so arranged that when in neutral position its operated end 53 is disposed in a recess 54 in the plate 48 and thus locked against forward and backward tilting movement, that is, movement in a direction to change speeds. Upon the shifting rods 44 and 45 are mounted and rigidly secured blocks 55 and 56 respectively, which carry spring-pressed plungers 57 and 58 constantly urged against the operated end 53 of the shifting lever as shown in Fig. 3, and spring-pressed balls 59 and 61 urged into a central hole 62 in the locking plate. The spring-pressed plungers 57 and 58 hold the shifting lever against vibration and lateral displacement, but it will be apparent that the lever may be tilted laterally in either direction to move its operated end 53 from the recess 54 into either the pocket 63 or 64 formed in the blocks 55 and 56 respectively. When the upper or operating end of the lever 51 is tilted to the right as indicated by the dotted centerline A, Fig. 3, the lower or operated end 53 will be moved into the pocket 63, against the pressure exerted by the plunger 57 and the lever will now be free to be tilted either forwardly or backwardly for shifting the rod 44 lengthwise to engage either the first speed clutch or the reverse, as the case may be. It will be noted that the plunger 57 remains in fixed relation with the end 53 of the lever when the latter is shifted to change speeds, and thus there is no objectionable frictional or rubbing engagement between the lever and spring pressed parts as is found in other shifting devices now in common use. During the operation of the lever, as just mentioned, and in which its operated end 53 is withdrawn from the plunger 58, this plunger will be held by its cotter pin 65 from following the lower end of the lever. These cotter pins on the plungers are so arranged, however, as not to interfere with pressure of the plungers on the lever when the latter is in neutral position. As shown in Figs. 1 and 3, the plate 48 had a centrally located transverse opening 66 above the opening 62 and in which is disposed a locking ball 67. This ball serves the purpose of positively locking either block 55 or 56 to the plate 48 when the other block has been moved by the lever 51 to change speed. That is, the blocks 55 and 56 are formed with openings 68 and 69 respectively in alinement with the opening 66, and when for example the block 64 is shifted, it will force the ball 67 partially into the opening 69 in the block 56, thus positively locking this block to the plate 48. The block 56 can not, therefore, be shifted until the block 55 has been returned to neutral position. An additional locking and locating means is provided between the blocks and the plate 48 consisting of the spring-pressed balls 59 and 61 previously mentioned, which are adapted to engage in the holes 71 and 72 in the plate 48 for determining the extent of the shifting movement and for holding the shifted parts in the position to which they have been moved. Thus, following the example just illustrated, when the lever is tilted laterally to the position A and then shifted rearwardly, that is, the upper end is swung to the left viewing Fig. 1, the ball 59 will be withdrawn from the opening 62 and will engage in the opening 72 at the completion of the movement which engages the first speed clutch. The spring-pressed ball 59 will thus hold the parts in this shifted position, and the spring-pressed plunger 57 will likewise exert a pressure on the lever tending to hold it in the adjusted position. Upon swinging the upper end of the lever to the right, Fig. 1, to its full forward position, the reverse clutch will be engaged and the ball 59 will locate in the hole 71 in the locking plate. Upon engagement of either the first speed or reverse clutches the block 56 will be positively locked against movement by the ball 67 as will be obvious. The second speed is obtained by tilting the lever to the left, as shown in Fig. 4, thus moving the operated end 53 of the lever into the pocket 64, and upon swinging the lever forward the block 56 and rod 45 will be shifted to engage the second clutch, in which position the ball 61 will lock in the hole 71. Upon now shifting the lever to its rearmost position, the third or direct speed clutch will be engaged, in which position the parts are shown in full lines in Fig. 4. In this position it will be noted that a lateral projection or boss 73 on the operated end 53 of the lever is engaged in an opening 74 in the plate 48 and thereby held in the third speed position. The purpose of this additional lock is to counteract the effect to the spring 23, which is compressed when the direct speed clutch is engaged and consequently has a tendency to return the shiftable parts to neutral position. It will thus be seen that I have provided an exceptionally simple and thoroughly practical shifting means which retains the parts in shifted position and positively locks against movement those shiftable parts which remain in neutral position. It will also be noted that the shifting device comprises but very few parts compactly arranged and occupying but little space.

It is believed that the foregoing conveys a clear understanding of the principles and objects of my invention, and while I have illustrated herein but a single working embodiment, it should be understood that the same is capable of considerable change as regards the number of speed changes, and the construction and arrangement without departing from the spirit and scope of the invention as expressed in the appended claims, in which—

I claim:

1. In a shifting device of the character described, the combination of a pair of longitudinally shiftable rods, a stationary dividing plate interposed between the rods, a shifting lever the operated end of which is normally disposed in a recess in said plate, and a yieldable plunger carried by each rod and constantly urged against the adjacent side of said operated end of the lever, the lever being tiltable laterally in either direction whereby to retract the respective plunger and be brought into coöperative relation with its respective rod for the purpose of shifting said rod longitudinally.

2. In a shifting device, the combination of a pair of longitudinally shiftable rods, a stationary locking plate interposed between said rods, a shifting lever the operated end of which is normally disposed in a recess in the locking plate and held thereby against shifting movement, means carried by each shifting rod and with which the operated end of the lever is engageable by lateral tilting movement of the lever to withdraw its operated end from said recess whereupon the lever may be shifted to move said means and its rod lengthwise, and means operative between the plate and operated end of the lever for locking said lever against movement from a shifted position.

3. In a shifting device, the combination of a pair of longitudinally shiftable rods, a stationary locking plate interposed between said rods, a shifting lever the operated end of which is normally disposed in a recess in the locking plate and held thereby against shifting movement, means carried by each shifting rod and with which the operated end of the lever is engageable by lateral tilting movement of the lever to withdraw its operated end from said recess whereupon the lever may be shifted to move said means and its rod lengthwise, the operated end of the lever having a lateral projection and the plate having an opening adapted to receive said projection when the lever has been moved to a rod shifting position.

4. A shifting mechanism of the character described comprising a casing, a pair of shifting rods mounted on the casing below the top wall thereof, a dividing plate between said rods supported by the casing and having a lever-retaining recess, a shifting lever mounted on the casing with its operated end normally disposed in said recess and held by the dividing plate against movement longitudinally of the shifting rods, and a block fixed to each shifting rod and carrying a spring-pressed plunger which bears directly against the adjacent side of said operated end of the shifting lever to normally hold said lever against accidental lateral shifting, each block having a recess for the reception of said operated end of the lever, whereby the lever may be moved transversely in either direction against the pressure of the respective plunger to engage its operated end in the selected block recess, thereby permitting the block to be shifted lengthwise by the lever during which operation the operated end of the lever will be yieldingly urged against the dividing plate by the plunger under compression.

AXEL HJ. ASPROOTH.